April 27, 1926.

F. J. MOORE

PLANETARY TRANSMISSION

Filed Nov. 12, 1925

1,582,772

2 Sheets-Sheet 2

Inventor
F. J. Moore
By
Attorney

Patented Apr. 27, 1926.

1,582,772

UNITED STATES PATENT OFFICE.

FRANCIS J. MOORE, OF NICHOLLS, GEORGIA.

PLANETARY TRANSMISSION.

Application filed November 12, 1925. Serial No. 68,615.

*To all whom it may concern:*

Be it known that I, FRANCIS J. MOORE, a citizen of the United States, residing at Nicholls, in the county of Coffee and State of Georgia, have invented certain new and useful Improvements in Planetary Transmissions; and I do hereby declare the following to be a full, clear, and exact description of the invention, such as will enable others skilled in the art to which it appertains to make and use the same.

This invention relates to transmissions for automobiles, and more particularly to automobile tranmissions of the planetary type.

The invention has for one of its objects the provision of a novel, simple and inexpensive transmission of the character stated which shall be especially adapted for use in connection with the transmission of Ford automobile trucks whereby to afford a greater number of speeds than are now provided for and thus permit the truck to be more efficiently controlled.

Figure 1:
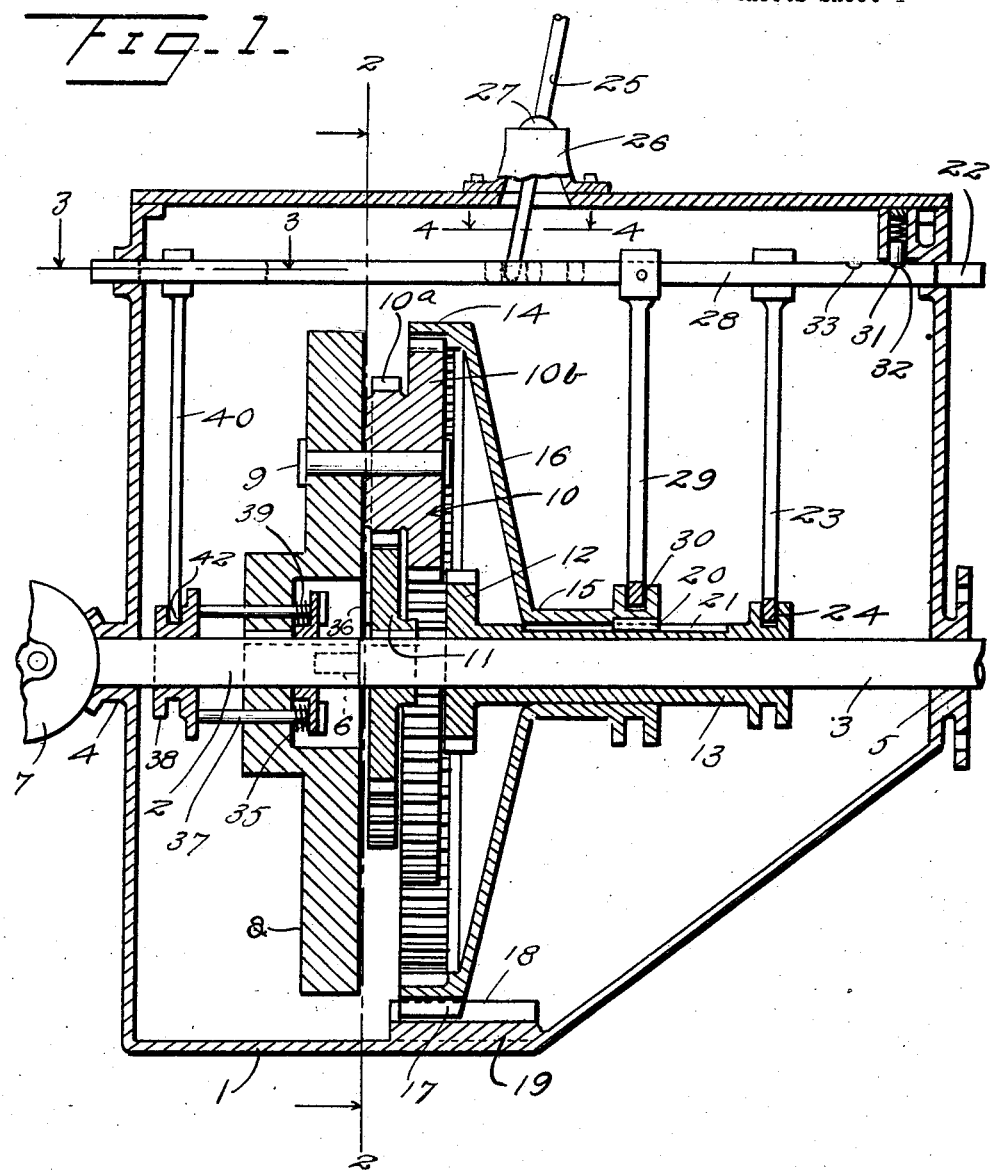
Figure 2:
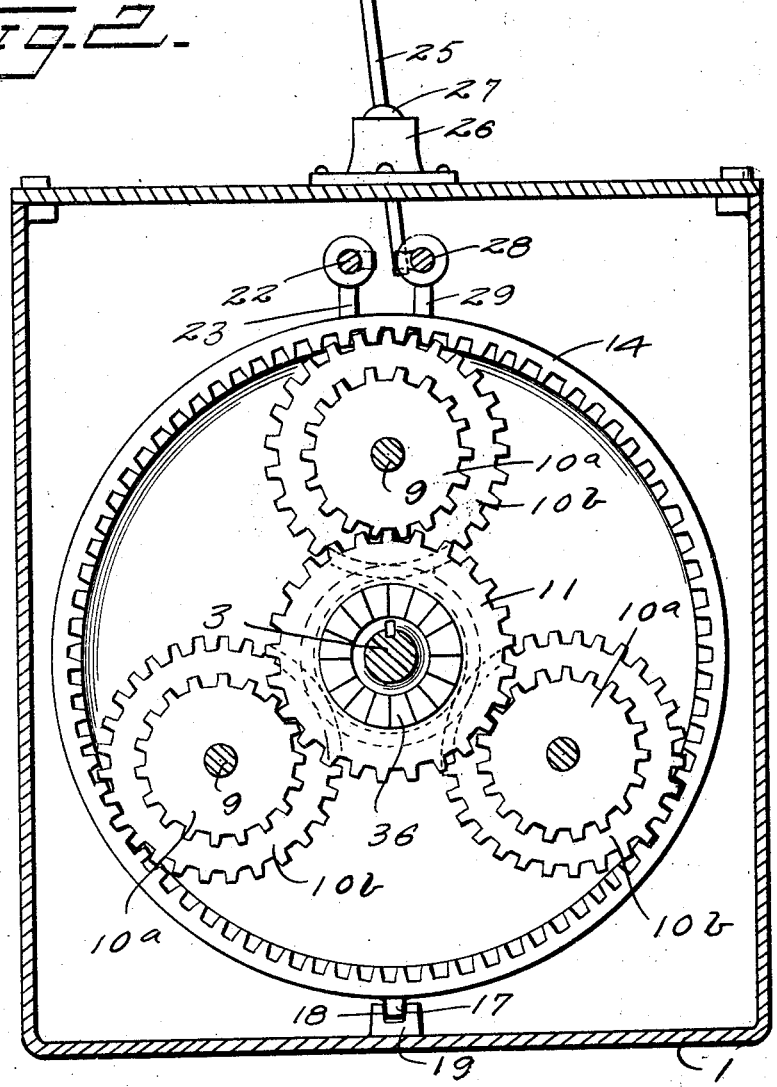
Figure 3:
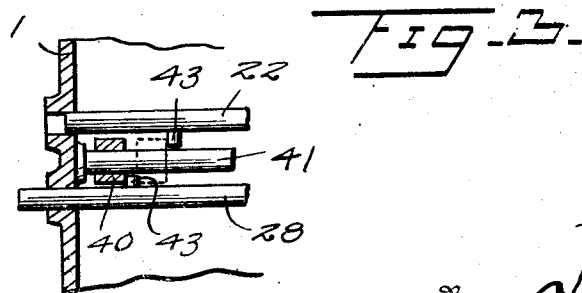

With the above and other objects in view, the invention consists of the construction, combination and arrangement of parts hereinafter fully described and claimed, and illustrated in the accompanying drawings, wherein:

Figure 1 is a sectional view taken on a vertical plane extending axially through a transmission embodying my invention, Figure 2 is a sectional view taken on the vertical plane indicated by the line 2—2 of Figure 1, Figure 3 is a detail sectional view taken on the horizontal plane indicated by the line 3—3 of Figure 1, and Figure 4 is a similar view taken on the horizontal plane indicated by the line 4—4 of Figure 1.

Corresponding and like parts are referred to in the following description, and designated in the several views of the accompanying drawings, by similar reference characters.

In the drawings 1 designates the case, 2 the driving shaft, and 3 the driven shaft of the transmission. The case 1 is provided with bearings 4 and 5 in which the shafts 2 and 3 are journaled, respectively. The adjacent ends of the shafts 2 and 3 are connected as shown at 6, and this connection is such as to permit the shafts to rotate one with respect to the other. The shaft 2 is provided with a universal joint 7 to permit it to be connected to the driven shaft of the main transmission of the truck.

A fly-wheel 8 is keyed to the shaft 2, and is provided with a plurality of equally spaced pins 9 on which duplex gear units 10 are rotatably mounted. The small gears 10$^a$ of the units 10 constantly mesh with a gear 11 keyed to the shaft 3. A non-rotatable gear 12 which is carried by a sleeve 13 slidably mounted on the shaft 3, is adapted to be moved into and out of engagement with the inner or opposing sides of the large gears 10$^b$ of the units 10. An interior gear 14 which is also non-rotatable and carried by a sleeve 15 slidably mounted on the sleeve 13, is adapted to be moved into and out of engagement with the outer sides of the large gears 10$^b$ of the units 10. A disk 16 connects the interior gear 14 to the sleeve 15. A lug 17 on the interior gear 14 and slidably mounted in the groove 18 of a block 19 carried by a wall of the case 1, holds this gear and the parts associated therewith against rotation. The gear 12 is held against rotation by a key 20 which is carried by the sleeve 15 and slidable in a groove 21 in the sleeve 13.

A rod 22 slidably supported by the case 1, an arm 23 secured to the rod 22 and connected as at 24 to the sleeve 13, and a lever 25 supported for universal movement on the case 1 by a socket 26 and ball 27, provide means by which the gear 12 may be moved into and out of engagement with the large gears 10$^b$ of the units 10. A rod 28 also slidably supported by the case 1, an arm 29 secured to the rod 28 and connected as at 30 to the sleeve 15, and the lever 25, provide means by which the gear 14 may be moved into and out of engagement with the large gears 10$^b$ of the units 10. The gears 12 and 14 are held against casual movement into or out of engagement with the large gears 10$^b$ of the units 10 by spring pressed plungers 31 carried by the case 1. Each of the rods 22 and 28 is provided with a socket 32 for the reception of the plunger 31 when the gear connected thereto is in mesh with the large gears 10$^b$ of the units 10 and with a socket 33 for the reception of the plunger when the gear connected thereto is out of mesh with said large gears. The rods 22 and 28 are each provided with a yoke 34 into one of which the inner end of the lever 25 is swung when it is desired to move either of the gears 12 or 14 into or out of engagement with the large gears 10<sup>b</sup> of the units 10.

A clutch member 35 carried by the fly-wheel 8 and a clutch member 36 carried by the gear 11, permit this gear to be coupled to the shaft 2. The clutch member 35 is carried by rods 37 slidably supported by the fly-wheel 8 and connected to a groove collar slidably mounted on the shaft 2. The clutch member 35 is normally held in engagement with the clutch member 36 by springs 39, and is adapted to be moved out of engagement with the clutch member 36 when either of the gears 12 or 14 is moved into engagement with the large gears 10<sup>b</sup> of the units 10. An arm 40 slidably supported at its upper end on a rod 41 carried by the case 1 and provided at its lower end with a fork 42 fitting in the groove of the collar 38, is adapted to be moved to effect the release of the gear 11 from the shaft 2 when either of the gears 12 or 14 is moved into engagement with the large gears 10<sup>b</sup> of the units 10, and to permit of this being done the rods 22 and 28 are each provided with a pin 43 for contact with the arm 40.

The manner in which the transmission operates may be stated to be as follows: When the gear 11 is clutched to the shaft 2, the gears 12 and 14 are out of engagement with the gears 10<sup>b</sup>, and the shaft 3 will be driven directly from and at the speed of the shaft 2. When it is desired to drive the shaft 3 at a lower speed, the clutch member 35 is moved out of engagement with the clutch member 36 and the gear 12 is moved into engagement with the gears 10<sup>b</sup>, and this may be done by swinging the lever 25 laterally to carry its inner end into the yoke 34 of the rod 22 and by thence swinging the lever rearwardly. The shaft 3 will now be driven from the shaft 2 through the gears 10<sup>a</sup> and 11. By swinging the lever 25 forwardly, the gear 12 will be moved out of engagement with the gears 10<sup>b</sup> and the clutch member 35 freed for movement into engagement with the clutch member 6 by the springs 39. When it is desired to drive the shaft 3 at a higher speed, the lever 25 is rocked laterally to carry its inner end into the yoke 34 of the rod 28, and thence swung rearwardly to withdraw the clutch member 35 from engagement with the clutch member 36 and move the gear 14 into engagement with the gears 10<sup>b</sup>. The shaft 3 will now be driven from the shaft 2 through the gears 10<sup>a</sup> and 11, but at a higher speed than when the gear 12 is in engagement with the gears 10<sup>b</sup> due to the fact that the gear 14 is larger than the gear 12. When the lever 25 is operated to withdraw the gear 14 from engagement with the gears 10<sup>b</sup>, the clutch member 35 will be released.

From the foregoing description, taken in connection with the accompanying drawings, it will be seen that when the lever 25 is in neutral position the shaft 3 is clutched to the shaft 2, that when it is desired to drive the shaft 3 at a higher speed than that of the shaft 2 it is only necessary to operate the lever 25 to effect a declutching of the shaft 3 from the shaft 2 and the engagement of the gear 14 with the gears 10<sup>b</sup>. It will be further apparent that whenever the gear 12 or the gear 14 is withdrawn from engagement with the gears 10<sup>b</sup> the shaft 3 will be clutched to the shaft 2.

While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. A planetary transmission comprising driving and driven shafts, a member keyed to the driving shaft, a plurality of duplex gear units rotatably carried by said member, a gear fixed to the driven shaft and meshing with certain of the gears of said units, a clutch connecting the shafts, non-rotatable gears of different size slidably mounted with respect to each other and said units, and means by which the clutch may be operated to release the shafts and one of said non-rotatable gears moved into engagement with the other gears of said units.

2. A planetary transmission comprising driving and driven shafts, a member fixed to the driving shaft, a plurality of duplex gear units rotatably supported by the member, a gear fixed to the driven shaft and meshing with certain gears of said units, inner and outer sleeves slidably mounted one upon the other and upon the driven shaft, means for holding the sleeves against relative rotation, a gear carried by the inner sleeve, an interior gear carried by the outer sleeve, means for holding the interior gear against rotation, and means by which one of the gears carried by the sleeves may be moved into engagement with the other gears of said units.

In testimony whereof I affix my signature.

FRANCIS J. MOORE.